(12) United States Patent
Hsieh et al.

(10) Patent No.: US 7,239,499 B2
(45) Date of Patent: Jul. 3, 2007

(54) CAPACITOR ASSEMBLY WITH A THERMAL INSULATION APPARATUS

(75) Inventors: Kuan-Hong Hsieh, Guangdong (CN); Han-Che Wang, Guangdong (CN); Te-Hsu Wang, Guangdong (CN); Dao-Ming Peng, Guangdong (CN); Shin-Hong Chung, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,962

(22) Filed: May 30, 2006

(65) Prior Publication Data

US 2007/0002527 A1 Jan. 4, 2007

(30) Foreign Application Priority Data

Jul. 1, 2005 (CN) .................. 2005 2 0061099

(51) Int. Cl.
*H01G 5/017* (2006.01)
*H01G 2/14* (2006.01)

(52) U.S. Cl. .................................. 361/274.1; 361/323

(58) Field of Classification Search .. 361/274.1–274.3, 361/511, 530, 323
See application file for complete search history.

(56) References Cited

U.S. PATENT DOCUMENTS

| 3,656,035 | A | * | 4/1972 | Corman et al. | .......... | 361/274.3 |
| 5,769,907 | A | * | 6/1998 | Fukuda et al. | ............. | 29/25.03 |
| 5,838,532 | A | * | 11/1998 | Nakata | ...................... | 361/505 |
| 7,031,141 | B2 | * | 4/2006 | Kuriyama | .................... | 361/528 |
| 2006/0120012 | A1 | * | 6/2006 | Tsunezaki et al. | ....... | 361/274.1 |

* cited by examiner

*Primary Examiner*—Eric W. Thomas
(74) *Attorney, Agent, or Firm*—Winston Hsu

(57) ABSTRACT

A thermal insulation apparatus for a capacitor and the capacitor with the thermal insulation apparatus is provided. The thermal insulation apparatus includes a basis, a thermal baffle is stretched upwards from a side wall of the basis, a bracket is connected with a inner wall of the basis. The basis and the bracket form a cavity to hold the capacitor. The thermal insulation apparatus can isolate the capacitor from external heat sources. After assembly, a distance lies between the bracket and the basis of the thermal insulation apparatus so that the capacitor can eliminate heat efficiently.

12 Claims, 3 Drawing Sheets

CAPACITOR ASSEMBLY WITH A THERMAL INSULATION APPARATUS

FIELD OF THE INVENTION

The present invention relates to a thermal insulation apparatus for a capacitor.

DESCRIPTION OF RELATED ART

Capacitors are used in electronic devices for isolating DC, coupling, and filtering waves, etc. The service life of a capacitor, especially the service life of an electrolytic capacitor is affected severely by temperature. If the temperature increases 10 degrees, the service life of electrolytic capacitor will be reduced by half. More importantly, when temperature increases, the insulation resistance of the electrolytic capacitor will reduce, accordingly, the condenser leakage will become serious such that the electrolytic capacitor will generate heat so rapidly that an electrolytic liquid of the electrolytic capacitor evaporating into gas, causing the electrolytic capacitor might bubble up or pop liquid out.

As the operating speed and power consumption of electronic devices are keeps on increasing, the quantity of heat that electronic devices produce also increases. Capacitors are usually exposed to the circuit board, so the heat given off by electronic devices will directly cause an increase in temperature of the capacitor.

Therefore, what is needed is a thermal insulation apparatus for a capacitor; to isolate the capacitor from external heat sources so as to increase the service life of the capacitor.

SUMMARY OF INVENTION

A thermal insulation apparatus for a capacitor is provided herein. The thermal insulation apparatus includes a basis, a thermal baffle is stretched upwards from a side wall of the basis, a bracket is connected with the inner wall of the basis. The basis and the thermal baffle form a cavity for receiving a capacitor.

Further features and advantages will be provided or will become apparent in the course of the following detailed description.

DETAILED DESCRIPTION

Figure 1:
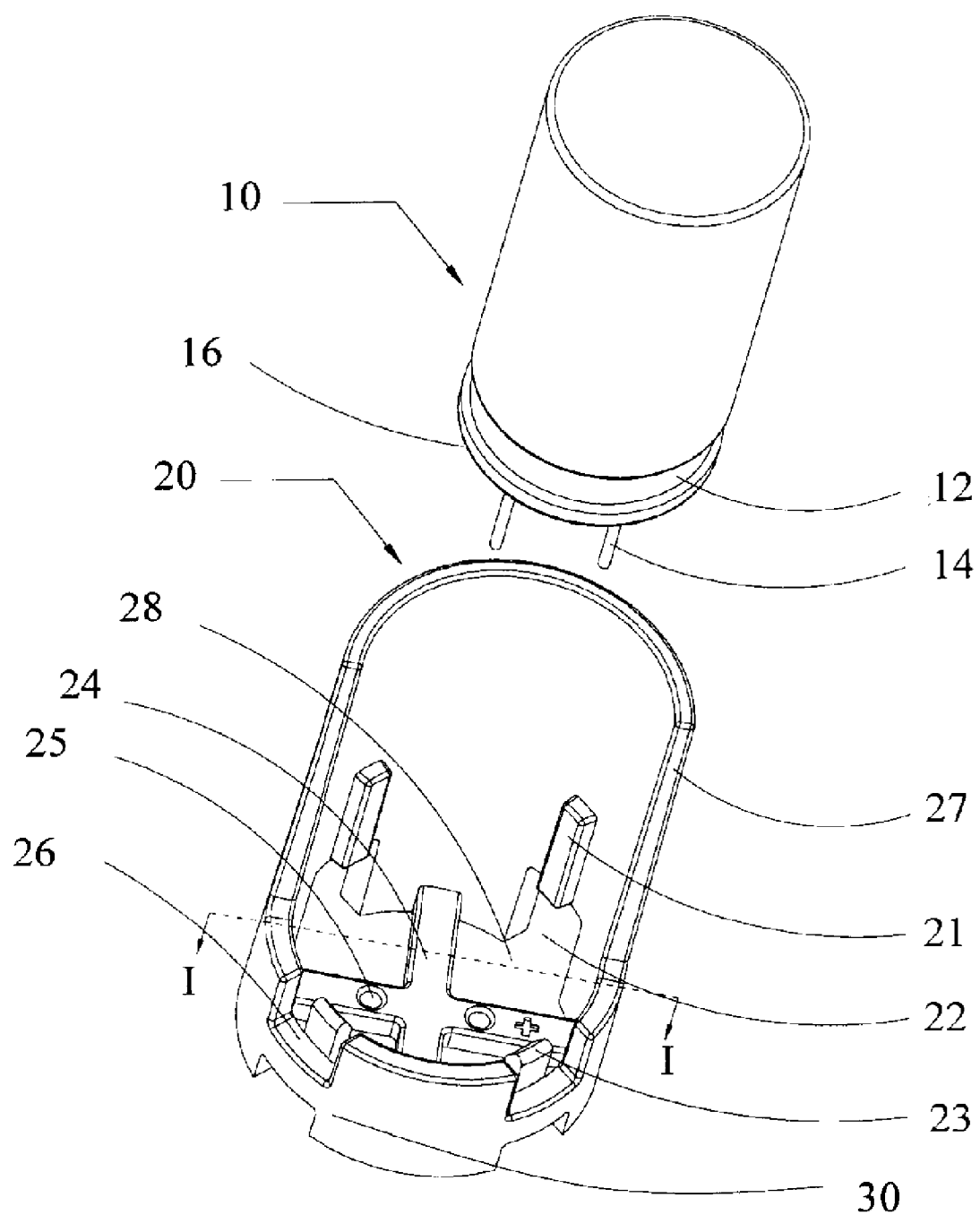
FIG. 1 is an exploded illustration of a thermal insulation apparatus and a capacitor.
Figure 2:
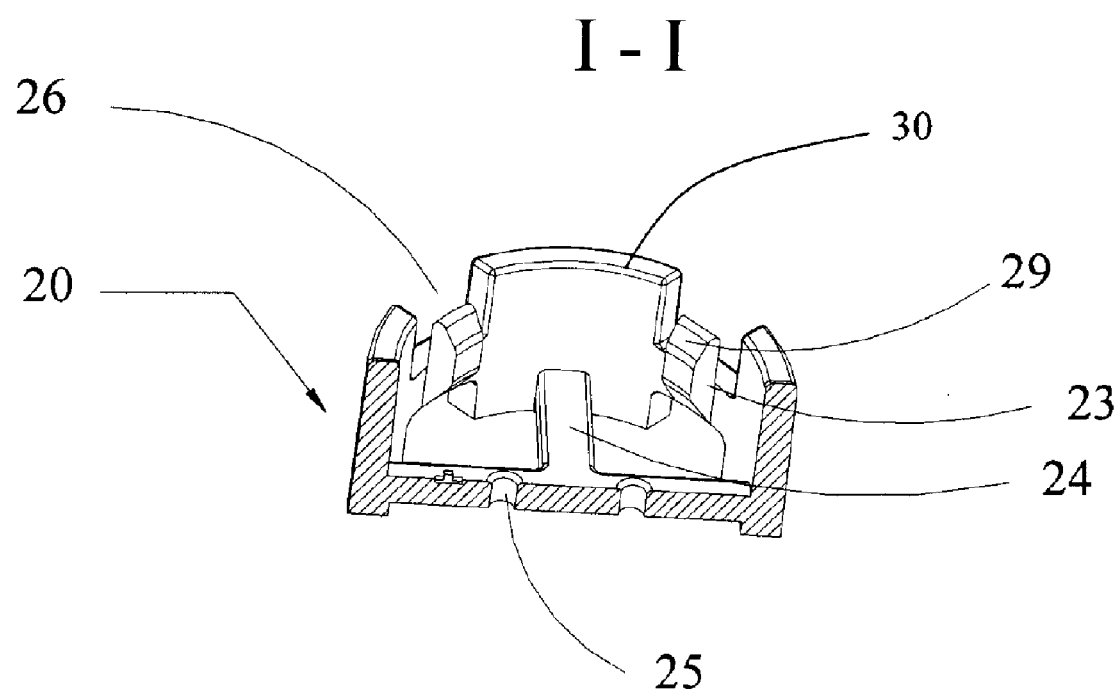
FIG. 2 is a I-I cutaway illustration of the thermal insulation apparatus of FIG. 1.

Referring to FIGS. 1 and 2, a thermal insulation apparatus and a capacitor are shown. The thermal insulation apparatus 20 is made of thermal insulation material, for example, plastic material. The thermal insulation apparatus 20 includes a round-hollow basis 30 (hereinafter, "the basis"). The basis 30 defines a plurality of air ducts 22, and a plurality of elastic buckles 23 on its inner wall. Furthermore, the basis 30 defines a plurality of buckle slots 26 on its side wall. Each buckle slot 26 matches an elastic buckle 23, that is, each buckle slot 26 is aligned with an elastic buckle 23. A thermal baffle 27 is stretched upwards from the side wall of the basis 30.

Furthermore, a bracket 24 is positioned in a middle part of the inner wall of the basis 30. The bracket 24 and the basis 30 thereupon form a cavity 28 to hold the capacitor 10 therein. The bracket 24 defines a pair of through holes 25 for a corresponding foot 14 of a capacitor 10 to pass therethrough. The elastic buckles 23 may wedge into a ring-shaped groove 12 of the capacitor 10 to fix the capacitor 10 vertically. Each elastic buckle 23 has a slanted surface 29 for guiding the capacitor 10 into the cavity 28 of the thermal insulation apparatus 20 (see detailed description below). A width of the buckle slot 26 is slightly greater than a width of the elastic buckle 23, and thus the elastic buckle 23 can be deformed while the capacitor 10 couples to the basis 30.

Generally, thermal sources from the capacitor 10 are distributed out of a side of the capacitor 10. Accordingly, a shape of the thermal baffle 27 adopts a semi-tubular shape, however, the shape of the thermal baffle 27 can vary in accordance with the distribution of thermal sources out of the capacitor 10. The thermal baffle 27 is distributed a plurality of sticks 21 on its inner wall. Further, each stick 21 faces against a corresponding elastic buckle 23. The sticks 21 are capable of fixing the capacitor 10 horizontally and separating the capacitor 10 away from the thermal baffle 27, thereby benefiting the capacitor 10's thermal insulation, aeration, and thermal elimination.

Figure 3:
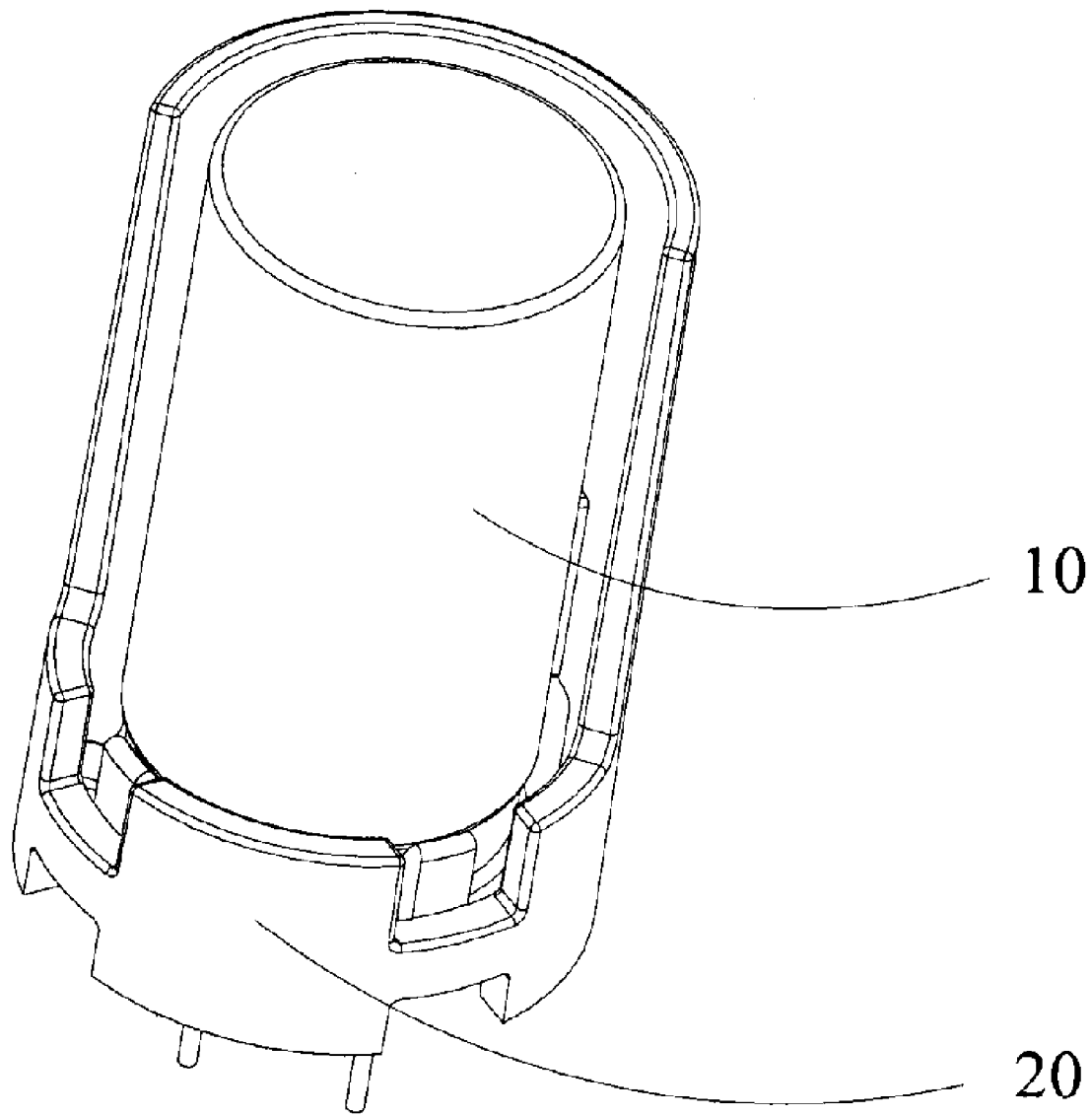
FIG. 3 is an assembly illustration of the thermal insulation apparatus and the capacitor of FIG. 1.

FIG. 3 shows an assembled capacitor and thermal insulation apparatus combination. In respect to the assembly, it mainly includes the steps as follows: putting the capacitor 10 into the cavity 28 of the thermal insulation apparatus 10; passing each feet 14 of the capacitor 10 through a corresponding through hole 25; letting a bottom surface 16 of the capacitor 10 touch the slanted surfaces 29 of the elastic buckles 23; pushing the capacitor 10 to slide on the slanted surfaces 29 until the bottom surface 16 touches the bracket 24, thereby the elastic buckles 23 are embedded in the ring-shaped groove 12 of the capacitor 10. The sticks 21 and the elastic buckles 23 fix the capacitor 10 horizontally and vertically.

The thermal insulation apparatus 20 can isolate the capacitor 10 from external heat sources, In addition, after assembly a distance is formed between the bracket 24 and the basis 30 of the thermal insulation apparatus 20 so that the capacitor 10 can eliminate heat efficiently.

Moreover, it is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A thermal insulation apparatus for a capacitor, the thermal insulation apparatus comprising:
    a basis;
    a thermal baffle stretched upwards from a side wall of the basis;
    a bracket connected with an inner wall of the basis;
    wherein the basis and the bracket form a cavity for receiving the capacitor.

2. The thermal insulation apparatus as claimed in claim 1, wherein the basis defines a plurality of air ducts at a surface thereof.

3. The thermal insulation apparatus as claimed in claim 1, wherein the basis defines a plurality of buckle slots on the side wall thereof.

4. The thermal insulation apparatus as claimed in claim 3, wherein an elastic buckle is aligned with a corresponding buckle slot and faces the thermal baffle, the elastic buckle wedging into a ring-shaped groove of the capacitor thereby fixing the capacitor.

5. The thermal insulation apparatus as claimed in claim 1, wherein the thermal baffle forms a plurality of sticks on an inner wall thereof.

6. The thermal insulation apparatus as claimed in claim 1, wherein the bracket defines a pair of through holes through which feet of the capacitor pass.

7. A capacitor assembly comprising:
a capacitor;
a ring-shaped groove on a bottom of the capacitor;
a thermal insulation apparatus comprising:
a basis;
a thermal baffle stretched upwards from a side wall of the basis;
a bracket connected with an inner wall of the basis;
wherein the basis and the bracket form a cavity for receiving the capacitor.

8. The capacitor asssembly as claimed in claim 7, wherein the basis defines a plurality of air ducts at the bottom thereof.

9. The capacitor assembly as claimed in claim 7, wherein the basis defines a plurality of buckle slots on the side wall thereof.

10. The capacitor assembly as claimed in claim 9, wherein an elastic buckle aligns with a corresponding buckle slot and faces the thermal baffle, the elastic buckle wedging into a ring-shaped groove of the capacitor thereby fixing the capacitor.

11. The capacitor assembly as claimed in claim 7, wherein the thermal baffle forms a plurality of sticks on an inner wall thereof.

12. The capacitor assembly as claimed in claim 7, wherein the bracket defines a pair of through holes through which feet of the capacitor pass.

* * * * *